United States Patent [19]

Muehling

[11] 4,036,078
[45] July 19, 1977

[54] BRAKE PEDAL POSITIONING MECHANISM

[76] Inventor: Anthony A. Muehling, 14583 Maddelein, Detroit, Mich. 48205

[21] Appl. No.: 692,418

[22] Filed: June 3, 1976

[51] Int. Cl.$^2$ .......................... G05G 5/22; G05G 1/16
[52] U.S. Cl. ...................................... 74/529; 74/531; 74/539
[58] Field of Search .................. 74/512, 529, 531, 539

[56] References Cited

U.S. PATENT DOCUMENTS

| 2,603,323 | 7/1952 | Muehling | 192/8 R |
| 2,884,805 | 5/1959 | Krause | 74/531 |
| 2,935,895 | 5/1960 | Krause | 74/512 X |
| 3,069,764 | 12/1962 | Swats et al. | 74/539 |

FOREIGN PATENT DOCUMENTS

| 41,785 | 4/1933 | France | 74/539 |

Primary Examiner—Carlton R. Croyle
Assistant Examiner—Leonard Smith
Attorney, Agent, or Firm—Reising, Ethington, Barnard, Perry and Brooks

[57] ABSTRACT

A vehicle parking brake pedal positioning mechanism of the disclosure positions a parking brake pedal in an actuated condition against pivotal movement toward a released position by an infinite position locking action. A frame of the mechanism rotatably supports the brake pedal and a locking member about a common pivotal axis so as to be rotatable with respect to the frame and each other. The frame and the locking member respectively include first and second cam surfaces extending about the pivotal axis and having portions with increasing radii from the axis in a direction corresponding to the brake pedal movement from the released position to the actuated condition. A slide mounted to rotate with the brake pedal but to slide relative thereto has first and second opposite ends respectively engaged in a slidable manner with the first and second cam surface portions on the frame and the locking member such that the slide is locked between the cam surface portions to hold the pedal in the actuated condition in an infinite position manner. The locking member is normally spring biased about the pivotal axis in a direction so as to maintain the engaged condition between the second cam surface portion thereof and the second end of the slide and is selectively moved in the opposite direction to release the pedal for movement back to the released position. Preferably, the frame of the mechanism has a plate-like construction that is stamped to form a depression having a round aperture concentric with the pivotal axis and first and second round depression portions, with the first round depression portion defining the first cam surface, and with the second round depression portion mounting the locking member which has a round configuration and a round aperture that defines the second cam surface. A journal fixed to the brake pedal is rotatably supported within the round depression aperture of the frame and within a round aperture in a plate that maintains the locking member within the depression, and the journal includes a slot that receives the slide so that its opposite ends can engage the cam surface portions. A first leaf spring extends between the brake pedal and the locking member to provide the locking member bias and a pad pivotally mounted on the brake pedal is connected to the first leaf spring by a second leaf spring so as to be actuatable to release the locking member.

15 Claims, 6 Drawing Figures

BRAKE PEDAL POSITIONING MECHANISM

BACKGROUND OF THE INVENTION

1. Field of the Invention

The present invention relates to a vehicle parking brake pedal positioning mechanism for locking a parking brake pedal in an actuated condition against pivotal movement toward a released position.

2. Description of the Prior Art

Certain vehicle parking brake pedal positioning mechanisms include a parking brake pedal pivotally mounted on a frame for movement between an actuated condition and a released position. The brake pedal is connected by a suitable flexible cable or cables to the associated vehicle parking brakes to maintain an actuated brake condition when the pedal is moved to its actuated condition. The actuated pedal condition prevents vehicle movement during parking when the driver leaves the vehicle or during extended periods of standing while the driver remains in the vehicle. The pedal is usually detented in the actuated condition by a pawl and ratchet arrangement. A flexible cable is conventionally incorporated to selectively release the pawl and ratchet engagement and to thereby allow the panel to return to its released position so that normal vehicle operation may then take place.

Parking brake pedals of the above described type move rapidly from the actuated condition to the released position due to tension of the associated brake cables in the actuated condition. The pedal rapidly impacts a suitable stop upon reaching the released position and thereby causes a relatively loud banging sound that can startle a vehicle passenger or driver while causing an impact loading of the stop and the pedal portion which engages the stop. Also, the pawl and ratchet locking of this type of parking brake pedal mechanism allows positioning of the brake pedal in only a limited number of positions. The brake pedal position which corresponds to a fully actuated parking brake condition without over stressing the brake cables may correspond to a parking pedal position intermediate two adjacent positions in which the pawl and ratchet are capable of positioning the pedal. Consequently, the parking brake pedals will be only partially actuated if the brake pedal is detented in one of these positions or the associated brake cables will be over stressed and elastically and/or plastically strained if the pedal is detented in the other position to fully actuate the parking brakes.

It should be understood that locking mechanisms of the infinite position type have heretofore been utilized with clamps for holding a workpiece to be machined. See, for example, U.S. Pat. No. 2,603,323.

SUMMARY OF THE INVENTION

An object of the present invention is to provide an improved vehicle parking brake pedal positioning mechanism for positioning a parking brake pedal in an actuated condition against pivotal movement toward a released position by an infinite position locking action.

In carrying out the above object as well as other objects of the invention, the parking brake pedal positioning mechanism includes a frame that pivotally mounts a pedal and a locking member for movement about a common pivotal axis with respect to the frame and with respect to each other. The frame includes a first cam surface extending about the pivotal axis and including a portion having increasing radii therefrom moving in a direction corresponding to the brake pedal movement from the released position to the actuated condition. Likewise, the locking member includes a second cam surface extending about the pivotal axis and including a portion having increasing radii therefrom in the same direction as the first cam surface portion on the frame. A slide is mounted for rotation with the brake pedal and for sliding movement with respect thereto and includes first and second opposite ends respectively engaged in a slidable manner with the first and second cam surface portions on the frame and the locking member. The slidable engagement of the slide ends with the first and second cam surface portions locks the slide therebetween to provide an infinite position locking action for positioning the brake pedal in the actuated condition against movement toward the released position. A spring bias of the locking member normally biases it about the pivotal axis in a direction so as to maintain the slidably engaged condition between its second cam surface portion and the second end of the slide. The locking member is selectively moved in the other direction about the pivotal axis to release the slide from its locked condition so as to thereby permit the pedal to move to its released position.

Preferably, the frame of the pedal positioning mechanism has a plate-like construction and is stamped to form a depression with a round aperture concentric with the pivotal axis. A first round portion of the depression immediately adjacent the round aperture defines the first cam surface and is located in an eccentric relationship with respect to the pivotal axis so as to include the cam surface portion that has increasing radii from the axis in a direction corresponding to the pedal movement to the actuated condition. A second round portion of the frame depression is located immediately adjacent the first round portion on the opposite side thereof from the round aperture and is concentric with the pivotal axis. The locking member has a circular configuration and is received within the second round frame depression portion so as to pivot about the pivotal axis. A round aperture of the locking member is eccentric with respect to the pivotal axis and defines the second cam surface portion. The frame depression is closed by a plate that slidably engages the locking member in an axial relationship to retain the locking member within the depression. A round aperture of the plate is aligned with the round aperture of the depression and cooperates therewith in pivotally supporting a journal which is fixed to the pedal. A slot in the journal receives the slide whose opposite ends are slidably engaged with the cam surface portions.

The spring bias of the locking member is provided by a spring extending between the locking member and the pedal in the form of a first elongated leaf spring. One end of this leaf spring is hooked to receive a pin carried by the locking member and the other end of the spring is riveted to the pedal. A foot actuated pad pivoted to the pedal attaches one end of a second elongated leaf spring whose other end is connected to the first leaf spring.

During pedal movement to the actuated condition, the foot pad is depressed and the first leaf spring exerts a bias on the locking member. Pivoting of the locking member then proceeds in the same direction as the pedal but for a greater extent so as to maintain an engaged condition between the second cam surface portion of the locking member and the second end of the slide. With the pedal in the actuated condition, the foot pad is operated so as to pull on the first leaf spring through the second leaf spring and thereby pivot the locking member in a manner that releases the slide from its locked relationship between the cam surface portions. As the slide is released, the operator's foot counteracts the forces exerted on the pedal by the associated vehicle brake cable so that the locking member movement is not restrained by these forces acting between the slide ends and the cam surface portions. The locking member movement positions the second cam surface portion with respect to the first cam surface portion to allow pivoting of the slide as the pedal moves to the released position. A central depression and upper and lower projections on the foot pad facilitates operation of the pad. Between the slide and the foot pad, the pedal has a channel-shaped cross section that receives the first and second leaf springs. The first leaf spring which biases the locking member has a longer length than the second leaf spring that connects the foot pad to the first leaf spring.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
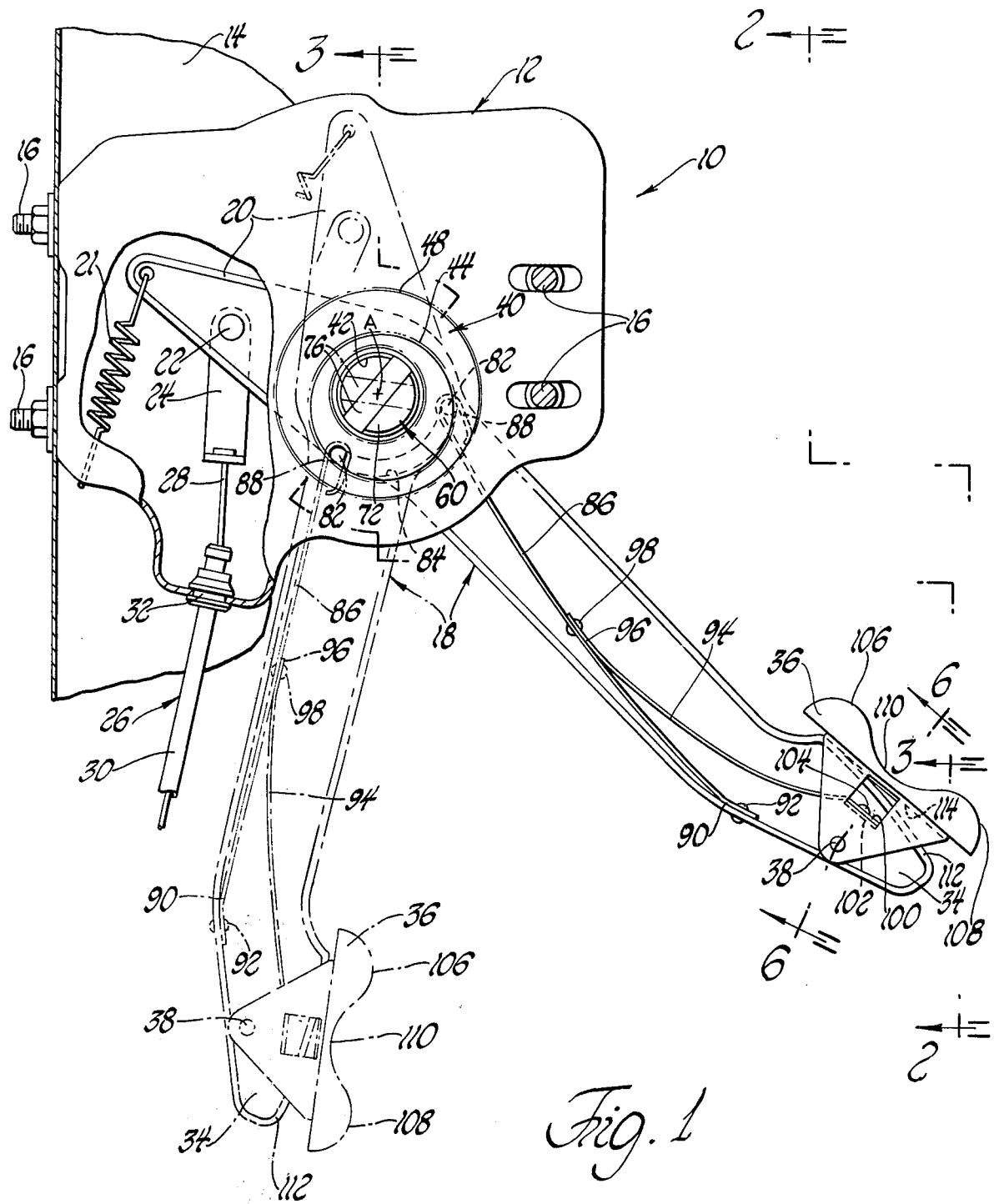
FIG. 1 is a side elevation view of a vehicle parking brake pedal positioning mechanism that embodies the present invention, with a pedal of the mechanism shown in a solid line indicated released position, and with the pedal also shown in a phantom line indicated actuated condition.
Figure 2:
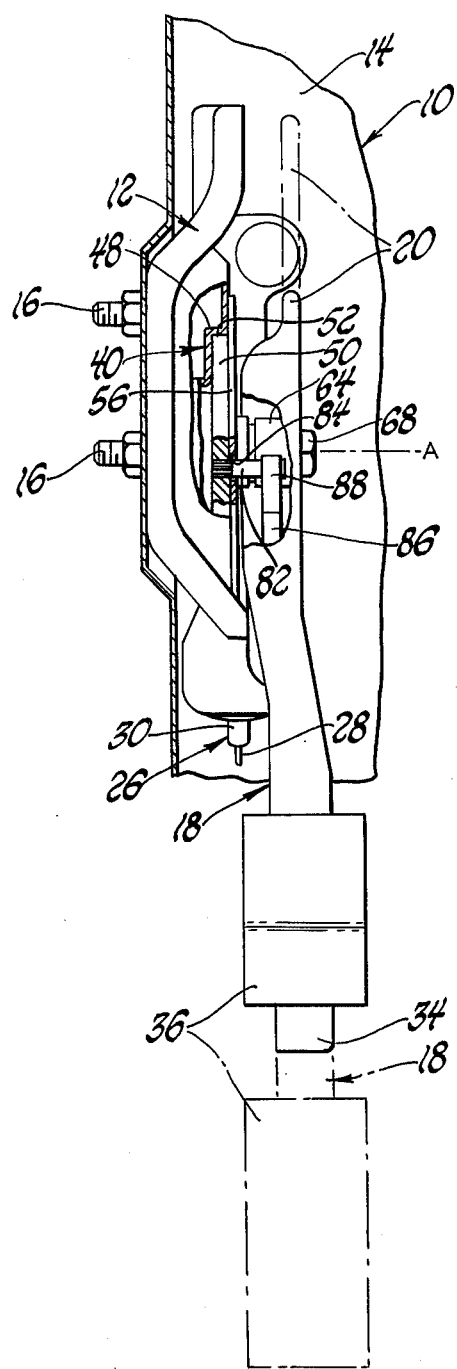
FIG. 2 is a partially broken away elevation view taken along line 2—2 of FIG. 1 looking forwardly with respect to the vehicle on which the positioning mechanism is mounted.

Referring to FIGS. 1 and 2 of the drawings, a vehicle parking brake pedal positioning mechanism according to the present invention is generally indicated by reference numeral 10 and includes a stamped steel frame 12 mounted on a body panel 14 by a plurality of threaded stud and nut mounts 16. A pedal 18 of the mechanism is pivotally mounted on frame 12 for movement about a pivotal axis A between the solid line indicated released position shown and the phantom line indicated actuated condition. As seen with particular reference to FIG. 1, an upper arm 20 of the pedal 18 is biased in counterclockwise direction about axis A by a spring 21 extending between the frame 12 and the pedal arm. The pedal arm 20 supports a pin 22 connected to the upper end of an attachment member 24. A parking brake cable 26 of the mechanism includes a wire 28 connected to the lower end of attachment member 24 and received within a sheathing 30 of the cable. An end fitting 32 of the cable sheathing is mounted on the mechanism frame 12 so that depression of the pedal 18 from the solid line released position to the phantom line actuated condition pulls the cable wire 28 through the sheathing and thereby actuates the associated vehicle parking brakes. A lower end 34 of the pedal 18 mounts a foot pad 36 by a pintle 38 for pivotal movement. The pedal 18 is depressed by an operator's foot pressing down on the pad 36 and is released from the actuated condition by foot actuated pivoting of the pad in a manner that will be more fully hereinafter described.

Figure 3:
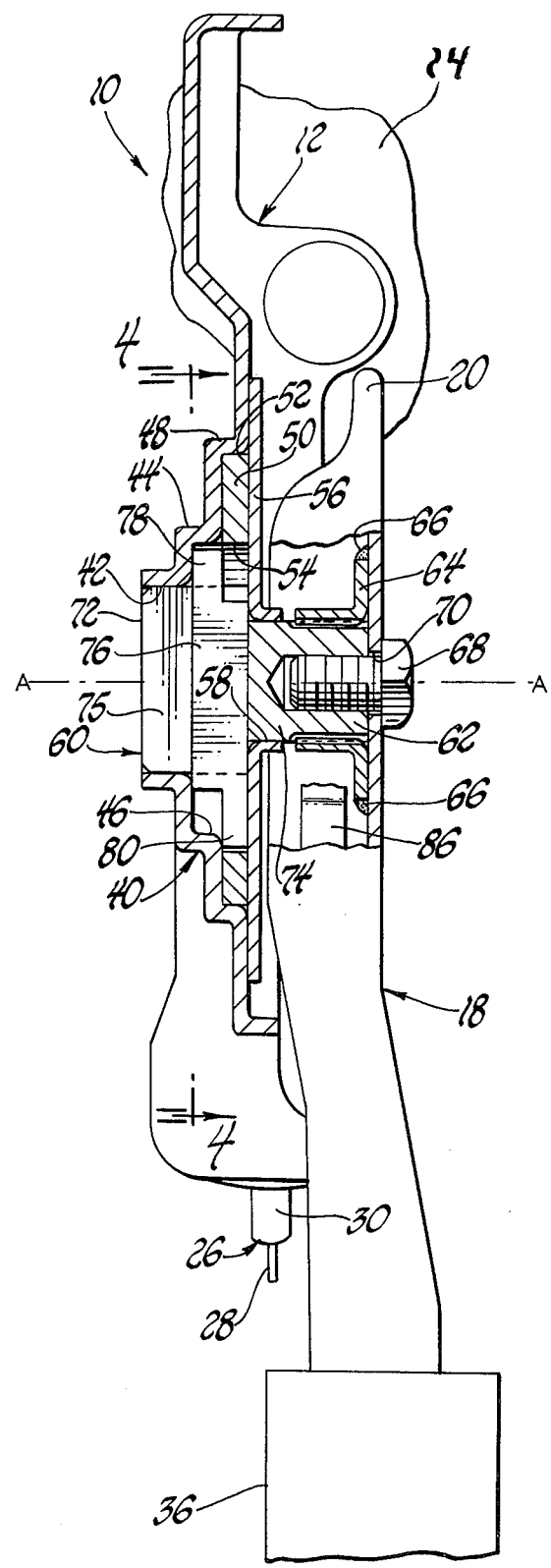
FIG. 3 is an enlarged sectional view through the mechanism taken generally along line 3—3 of FIG. 1.
Figure 4:
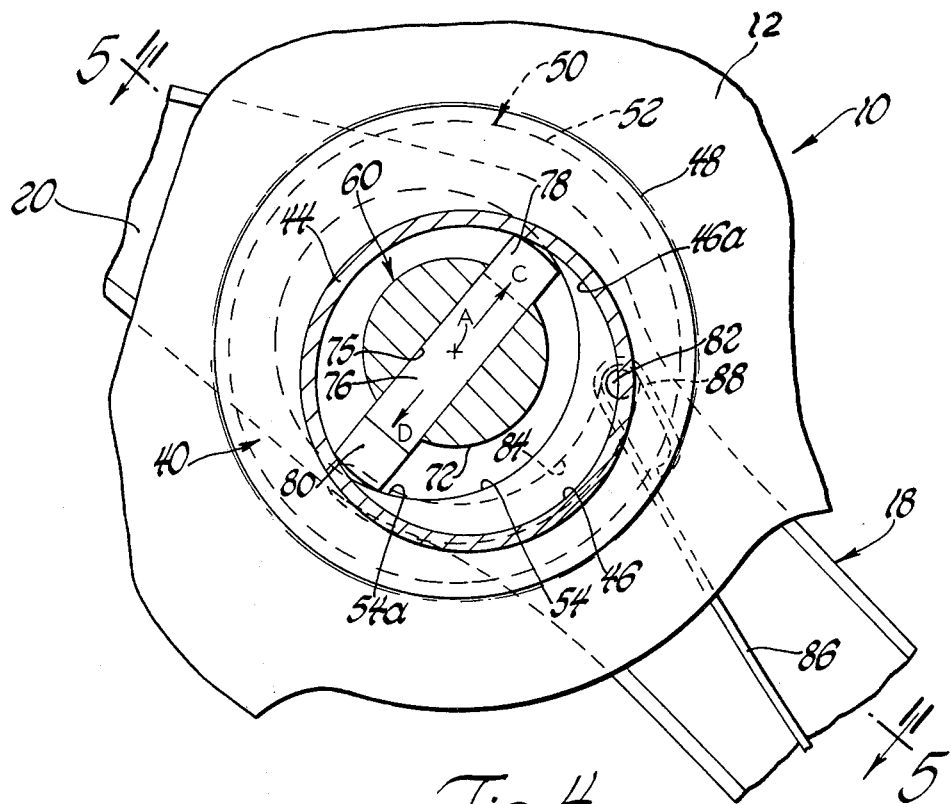
FIG. 4 is a side view of the positioning mechansim taken partially in section along line 4—4 of FIG. 3.
Figure 5:
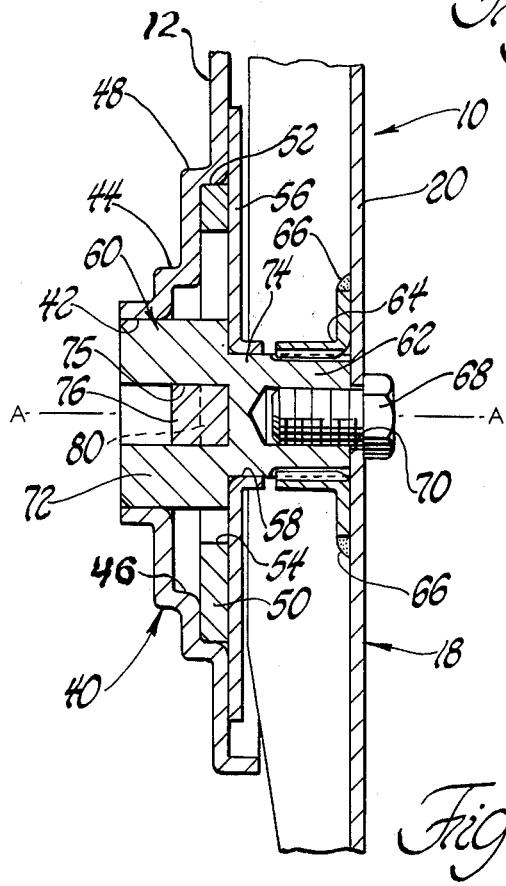
FIG. 5 is a sectional view through the mechanism taken along line 5-5 of FIG. 4.

With reference to FIGS. 3 and 5, the mechanism frame 12 has a plate-like construction and includes a stamped depression generally indicated by 40. A round aperture 42 of the frame depression 40 is concentric with the pivotal axis A and is located axially therealong immediately adjacent a first round depression portion 44. Depression portion 44 defines a first round cam surface 46 that faces inwardly toward the pivotal axis A and extends completely thereabout in an eccentric relationship with respect thereto as seen in FIG. 4. As best seen in FIG. 3, depression 40 also includes a second round depression portion 48 located immediately adjacent the first depression portion 44 along the pivotal axis A on the opposite side of the first depression portion from the depression aperture 42. Depression portion 48 receives a locking member 50 of a plate-like construction with a round configuration having an outer edge 52 slidably engaged with this round depression portion so that the locking member pivots about the axis A. Locking member 50 includes a second cam surface 54 that defines a round aperture through the locking member. The second cam surface 54 extends completely about pivotal axis A in an eccentric relationship with respect thereto and with respect to the first cam surface 46 of the frame when the locking member is in the position shown in FIG. 4. A plate 56, FIG. 3, is secured to the frame 12 in any suitable manner such as by welding and covers the frame depression 40 so as to engage the locking member in an axial relationship that maintains the locking member within the depression supported for pivotal movement about axis A. Plate 56 is stamped to define a round aperture 58 concentric with the pivotal axis A and cooperable with the depression aperture 42 to pivotally support a journal 60.

As seen by reference to FIGS. 3 and 5, the journal 60 has a splined end 62 received by an annular splined member 64 mounted on the pedal 18 in a suitable manner such as by welds 66. A bolt 68 concentric with the pivotal axis A extends through an aperture 70 of the pedal and is threaded into the journal end 62 so as to maintain the interengaged relationship of the journal with the splined member 64 in a manner that causes the journal to rotate with the pedal. An enlarged end 72 of journal 60 extends through the aperture defined by the second cam surface 54 of locking member 50 to be rotatably supported by the depression aperture 42 about axis A. An intermediate portion 74 of the locking member located between its splined end 62 and its enlarged end 72 is rotatably supported within the plate aperture 58. A slot 75 in the enlarged journal end 72 extends through the pivotal axis A and has opposite ends that open toward the cam surfaces 46 and 54. Journal slot 75 receives a slide 76 which rotates with the pedal but is slidable relative thereto in a radial direction with respect to the pivotal axis A. Slide 76 includes first and second opposite ends 78 and 80 that are axially offset with respect to the pivotal axis A so as to respectively engage first and second cam surfaces 46 and 54 in a slidable manner. First slide end 78 slidably engages the first cam surface 46 of the frame at a portion 46a thereof, FIG. 4, which has increasing radii from the pivotal axis A in a clockwise direction corresponding to the direction of brake pedal movement from the released position toward the actuated condition. Likewise, the second slide end 80 slidably engages the second cam surface 54 of the locking member at a portion 54a thereof that also has increasing radii from the pivotal axis A in a clockwise direction corresponding to the direction of brake pedal movement from the released position to the actuated condition.

Figure 6:
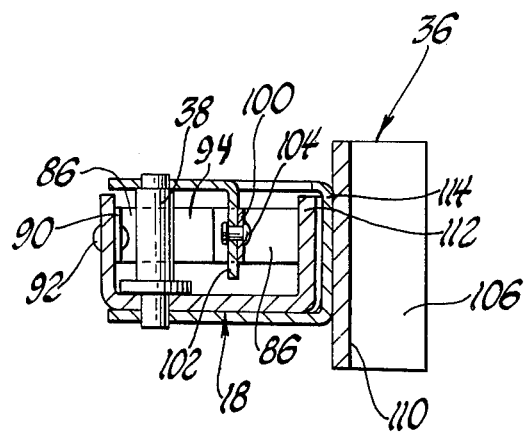
FIG. 6 is a sectional view of the mechanism taken along line 6—6 of FIG. 1 to show the mounting of a foot pad on the mechanism pedal.

As seen by combined reference to FIGS. 2 and 4, the locking member 50 carries a pin 82 that extends outwardly through an arcuate slot 84 in the plate 56 that maintains the locking member within the frame depression 40. A first elongated leaf spring 86 of the mechanism has one end 88 with a hook shape that receives pin 82 on the locking member. Another end 90 of the leaf spring 86 is secured to the pedal 18 adjacent foot pad 36 in a suitable manner such as by the rivet 92 shown in FIG. 1. A second elongated leaf spring 94 of the mechanism has one end 96 secured to an intermediate portion of spring 86 in a suitable manner such as by the rivet 98. Another end 100 of second leaf spring 94 is secured to a bent flange 102 of the pedal foot pad 36 by a suitable connection such as rivet 104. The pedal 18, as seen by particular reference to FIG. 6, has a channel shape taken in cross section so as to receive the two leaf springs 86 and 94. Leaf spring 86 has a longer length than the leaf spring 94 and extends between pedal 18 and locking member 50 so as to bias the locking member in a clockwise direction when the pedal is in the solid line released position of FIG. 1. Leaf spring 94 connects the foot pad 36 with the longer leaf spring 86 so as to permit actuation of the pad with the pedal in the phantom line actuated condition to release the mechanism for return of the pedal to the released position. Upper and lower projection 106 and 108 of the foot pad and an intermediate depression 110 are utilized to facilitate the actuation of foot pad 36 in a manner that will be more fully hereinafter discussed.

Operation of the brake pedal positioning mechanism 10 will now be described with reference to FIGS. 1 and 4 while keeping in mind the structure previously discussed. With the brake pedal 18 in the solid line released position of FIG. 1, the first elongated leaf spring 86 biases the mechanism locking member 50, FIG. 4, in a clockwise direction about pivotal axis A such that the second cam surface portion 54a is maintained in engagement with the second end 80 of the slide 76. Cam surface portion 54a has increasing radii in this clockwise direction and, consequently, decreasing radii in the counterclockwise direction so that its engagement with the slide end 80 also tends to move the slide with respect to the journal 60 in the direction of arrow C. As a result, the first slide end 78 is maintained in engagement with the first cam surface portion 46a of the stationary frame 12. An operator desiring to actuate the associated vehicle parking brakes depresses the pedal 18 by foot engagement with the upper projection 106 of the foot pad 36. During such depression, the pad 36 is at its limit of counterclockwise pivotal movement about pintle 38 due to engagement of respective flanges 112 and 114 of the pedal and the pad, see FIG. 6. Slide 76 is rotated in a clockwise direction with pedal 18 as the pedal is depressed to its actuated condition and the first slide end 78 then moves along the first cam surface portion 46a a in a clockwise direction about pivotal axis A. Cam surface portion 46a has increasing radii about this pivotal axis in the clockwise direction and allows the slide 76 to move in the direction of arrow C with respect to journal 60 as the pedal depression takes place. Locking member 50 is moved by the bias of spring 86 during the pedal depression so as to move the slide 76 in the direction of arrow C as permitted by the cam surface portion 46a. Sliding movement of the slide 76 in the direction of arrow C is actuated by the second cam surface portion 54a of locking member 50. This cam surface portion 54a has decreasing radii in the counterclockwise direction about pivotal axis A and, under the bias of the spring 86, the locking member 50 rotates further in the clockwise direction during the pivotal depression than the pedal such that the slide end 80 moves relative to cam surface portion 54a in a counterclockwise direction. Consequently, the slide 86 moves in the direction of arrow C as the first cam end 78 of the slide moves in a clockwise direction along the first cam surface portion 46a.

Once the brake pedal 18 is moved to a fully actuated condition such that the parking brake cable 26 fully actuates the associated vehicle parking brakes, the positioning mechanism 10 locks the pedal in an infinite position against movement back toward the released position. This locking action in an infinite position fashion permits the pedal to fully actuate the brakes without over stressing the parking brake cable components. Forces of the parking brake tend to rotate the pedal 18 in a counterclockwise direction such that the slide 76 is biased so as to urge its first end 78 in a counterclockwise direction along the first cam surface portion 46a of the stationary frame. Movement of slide end 78 along cam surface portion 46a in this direction requires the slide 76 to move in the direction of arrow D, FIG. 4. However, for the slide 76 to move in the direction of arrow D requires slide end 80 to slide in a counterclockwise direction along the second cam surface portion 54a of the locking member. But the bias exerted on the locking member 50 by slide end 80 due to the pedal is in a clockwise direction that tends to move slide end 80 along cam surface portion 54a in a counterclockwise direction. That net effect is that the slide 76 is locked between the cam surface portions in an infinite position manner that prevents the pedal movement back toward the released position.

To release the pedal 18 for movement from its phantom line indicated actuated condition of FIG. 1 back toward its solid line indicated released position, an operator places his foot on the lower projection 108 of the foot pad 36 so as to rotate the foot pad in a clockwise direction about its pintle 38 to the clockwise extent of movement allowed by flanges 112 and 114. This movement causes the second leaf spring 94 to pull the first leaf spring 86 downwardly and to the right about its lower end 90 so as to pivot locking member 50 counterclockwise about pivotal axis A. Consequently, the second cam surface portion 54a moves counterclockwise with respect to the slide end 80 to permit the slide to move in the direction of arrow D, FIG. 4, such that slide end 78 can move counterclockwise along the first cam surface portion 54a of the frame and thereby allow movement of the pedal back toward its released position. During this releasing action, the operator's foot counteracts the forces exerted on the pedal 18 by brake cable 26. The slide ends 78 and 80 are thus not interengaged with the cam surface portions 46a and 54a by the brake cable forces and the locking member 50 is thus not restrained by these forces during its counterclockwise movement. As the pedal moves to the released position, the locking member 50 is rotated not only by the pedal rotation but by the relative movement between the locking member and the pedal caused by the foot pad actuation previously described. Consequently, the locking member 50 pivots for a greater extent of movement than does the pedal 18 during the movement between the released position and the actuated condition.

While a preferred embodiment of the parking brake pedal position mechanism has herein been described in detail, those skilled in the art will recognize various alternatives, embodiments and constructions for practicing the present invention as defined by the following claims.

What is claimed is:

1. A vehicle parking brake pedal positioning mechanism comprising: a frame adapted for mounting on a vehicle body; a parking brake pedal mounted on the frame for movement about a pivotal axis between a released position and an actuated condition; said frame including a first cam surface extending about the pivotal axis and including a portion having increasing radii therefrom moving in a direction corresponding to the direction of brake pedal movement from the released position to the actuated condition; a locking member mounted on the frame for pivotal movement about the pivotal axis and including a second cam surface having a portion with increasing radii from the pivotal axis in the same direction as the first cam surface portion; a slide mounted for pivotal movement with the brake pedal and for sliding movement relative thereto; said slide including first and second opposite ends respectively engaged in a slidable manner with the first and second cam surface portion such that movement of the pedal from the released position to the actuated condition pivotally moves the slide into a locking relationship between the cam surface portions and thereby positions the pedal in the actuated condition in an infinite position manner against movement toward the released position; spring means for normally biasing the locking member about the pivotal axis to maintain an engaged condition between the second end of the slide and the second cam surface portion on the locking member; and release means for selectively pivoting the locking member about the pivotal axis in a direction opposite to the normal bias of the spring means so as to permit the pedal to move to the released position.

2. A mechanism as in claim 1 wherein the spring means comprises a spring extending between the locking member and the pedal.

3. A mechanism as in claim 2 wherein the release means comprises a foot pad mounted on the pedal and connected to the spring to move the locking member for releasing the pedal.

4. A mechanism as in claim 1 wherein the spring means comprises a first leaf spring having opposite ends respectively connected to the locking member and the pedal; and the release means including a movable foot pad mounted on the pedal and a second leaf spring having opposite ends respectively connected to the first leaf spring and the pad such that movement of the pad deflects the leaf springs to move the locking member for releasing the pedal.

5. A mechanism as in claim 4 wherein the pedal has a channel shape that receives the leaf springs.

6. A mechanism as in claim 4 wherein the first leaf spring has one end with a hook shape and the locking member includes a pin received within the hook shape of the one spring end to connect the first leaf spring to the locking member.

7. A mechanism as in claim 4 wherein the first leaf spring is longer than the second leaf spring.

8. A mechanism as in claim 4 and also including a pintle pivotally mounting the foot pad on the pedal, said pad normally being pivotally biased by the springs in one direction about the pintle and being pivotally movable about the pintle in the other direction by foot engagement such that the second spring pulls on the first spring to release the locking member from the bias of the first spring and to pull the locking member to release the slide from its locking relationship between the cam surface portions.

9. A mechanism as in claim 8 wherein the pad includes a central depression and upper and lower projections above and below the depression.

10. A mechanism as in claim 1 wherein the frame has a plate-like construction and includes a stamped depression defining a round aperture concentric with the pivotal axis, said depression also including first and second round portions spaced axially along the pivotal axis, the first round depression portion being eccentric with respect to the pivotal axis and defining the first cam surface, the second round depression portion being concentric with the pivotal axis and receiving the locking member, the locking member having a round outer edge slidably engaged with the second round depression portion so as to pivot about the pivotal axis and having a round aperture defined by the second cam surface in an eccentric relationship to the pivotal axis, a journal fixed with respect to the pedal and pivotally supported within the round aperture of the frame, and a slot within the journal that slidably receives the slide whose ends are engaged with the first and second cam surface portions.

11. A mechanism as in claim 10 wherein the first round depression portion is located axially along the pivotal axis intermediate the round aperture of the depression and the second round depression portion.

12. A mechanism as in claim 11 that also includes a plate mounted on the frame covering the depression and slidably engaged in an axial relationship with the locking member within the second round depression portion, and said plate including a round aperture that receives the journal and cooperates with the round aperture of the frame depression in supporting the journal.

13. A mechanism as in claim 10 wherein the first round depression portion defining the first cam surface and the round locking member aperture whose periphery defines the second cam surface having approximately the same diameter as each other.

14. A vehicle parking brake positioning mechanism comprising a frame having a plate-like construction including a stamped depression defining a round aperture concentric with a pivotal axis and also defining first and second round portions; a journal pivotally supported within the round aperture of the frame depression for movement about the pivotal axis; a parking brake pedal fixed to the journal so as to be supported for pivotal movement on the frame about the axis between a released position and an actuated condition; and first round depression portion of the frame being concentric with respect to the pivotal axis and defining a first cam surface having a portion with increasing radii from the axis in a direction corresponding to the direction of pedal movement from the released position to the actuated condition; said second round depression portion of the frame being concentric with the pivotal axis; a round locking member received within the second round depression portion of the frame for pivotal movement about the pivotal axis and including a second round cam surface defining a round aperture eccentric with respect to the pivotal axis; said second cam surface of the locking member including a portion having increasing radii from the pivotal axis in the same direction as the first cam surface portion; said journal defining a slot through the pivotal axis having opposite ends that respectively open toward the first and second cam surface portions; a slide received within the slot of the journal so as to rotate with the pedal while being capable of sliding relative thereto; said slide including first and second opposite ends respectively engaged in a slidable manner with the first and second cam surface portions such that movement of the pedal from the released position to the actuated condition pivotally moves the slide into a locking relationship between the cam surface portions and thereby positions the pedal in the actuated condition in an infinite position manner against movement toward the released position; spring means for normally biasing the locking member about the pivotal axis to maintain an engaged condition between the second end of the slide and the second cam surface portion on the locking member; and release means for selectively pivoting the locking member about the pivotal axis in a direction opposite to the normal bias of the spring means so as to permit the pedal to move to the released position.

15. A mechanism as in claim 14 wherein the spring means includes a first leaf spring having one end connected to the locking member and another end connected to the pedal, the release means including a pad pivotally mounted on the pedal and a second leaf spring having one end connected to the pad and another end connected to the first leaf spring.

* * * * *

UNITED STATES PATENT OFFICE
CERTIFICATE OF CORRECTION

Patent No. 4,036,078          Dated July 19, 1977

Inventor(s) Anthony A. Muehling

It is certified that error appears in the above-identified patent and that said Letters Patent are hereby corrected as shown below:

Column 1, line 25 "panel" should be --pedal--.
Column 5, line 68 after "46a" delete --a--.
Column 6, line 19 after "first" delete --cam--.
Column 6, line 43 "That" first instance, should be --The--.
Column 7, line 36, "portion" should be --portions--.
Column 8, line 66 "and" second instance, should be --said--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks